United States Patent
Chang et al.

(10) Patent No.: US 6,964,327 B2
(45) Date of Patent: Nov. 15, 2005

(54) ULTRASONIC CLUTCH

(76) Inventors: Kuo-Tsi Chang, No. 1, Lien-Kung Rd., Kungjing Li, Miaoli (TW); Min-Shen Ouyang, No. 101, Section 2, Kuang-Fu Rd., Hsinchu (TW)

( * ) Notice: Subject to any disclaimer, the term of this patent is extended or adjusted under 35 U.S.C. 154(b) by 352 days.

(21) Appl. No.: 10/317,712

(22) Filed: Dec. 11, 2002

(65) Prior Publication Data

US 2004/0112706 A1 Jun. 17, 2004

(51) Int. Cl.$^7$ ............................. F16D 28/00; H02N 2/02
(52) U.S. Cl. .................... 192/84.9; 192/84.1; 310/325; 310/369
(58) Field of Search ................................ 192/84.1, 84.9, 192/90, 84.4, 110 R; 310/311, 367, 325, 369, 333

(56) References Cited

U.S. PATENT DOCUMENTS

| | | | | |
|---|---|---|---|---|
| 3,578,995 A | * | 5/1971 | Massa ........................ | 310/334 |
| 3,995,179 A | * | 11/1976 | Flournoy et al. ........... | 310/335 |
| 4,663,556 A | * | 5/1987 | Kumada ..................... | 310/333 |
| 4,679,178 A | * | 7/1987 | Larsen et al. ............... | 367/157 |
| 5,051,647 A | * | 9/1991 | Uchikawa et al. .......... | 310/325 |
| 5,191,559 A | * | 3/1993 | Kahn et al. ................. | 367/157 |
| 5,869,917 A | * | 2/1999 | Ashizawa ................... | 310/333 |
| 5,942,838 A | * | 8/1999 | Lee et al. ................... | 310/333 |
| 2003/0048037 A1 | * | 3/2003 | Boyd ......................... | 310/318 |

FOREIGN PATENT DOCUMENTS

| JP | 63-217984 A | * | 9/1988 |
|---|---|---|---|
| JP | 63-242179 A | * | 10/1988 |

OTHER PUBLICATIONS

"Development of an Ultrasonic Clutch", Koyama, T. et al., 2003, http://www.google.com/search?q=cache:XYmJnm3yAdOJ:www.ieee-uffc.org/2003/Hawaii03/Abstracts/4F.pdf++%22ultrasonic+clutch%22&hl=en&ie=UTF-8.*

* cited by examiner

Primary Examiner—Rodney H. Bonck
(74) Attorney, Agent, or Firm—Rosenberg, Klein & Lee

(57) ABSTRACT

An ultrasonic clutch includes a driving element, a driven element and at least one alternating current (AC) power source. The driving element and the driven element are connected to a shaft of a driving device and an output axle of a loading, respectively. At least one of the driving element and the driven element is a piezoelectric device. When at least one of the driving element and the driven element is electrically connected to an AC power source, the near-field acoustic levitation, generated from the flexural vibration of the piezoelectric resonator above the piezoelectric resonator, occurs to push the driven element away from the driving element. Thus, the output shaft of the loading does not rotate with the axle of the driving device.

14 Claims, 16 Drawing Sheets

ULTRASONIC CLUTCH

BACKGROUND OF THE INVENTION

1. Field of the Invention

The present invention relates to an ultrasonic clutch, and more particularly to an ultrasonic clutch with a piezoelectric device to make a driven element move far away from a driving element when an alternating current (AC) electrical power is applied to the piezoelectric device.

2. Description of Related Art

A clutch is mounted between a driving device and a loading to make the two elements combine with each other or to separate the two elements when the clutch is actuated. A conventional clutch in accordance with the prior art substantially comprises a driving element connected to the driving device, and a driven element connected to the loading. When the driven element is attached to the driving element, the loading is connected to the driving device and actuated by the driving device.

A type of the conventional clutch comprises an engaging device arranged between the driving element and the driven element. The driving element and the driven element are connected or disconnected determined to the engagement or disengagement of the engaging device. However, the structure of the conventional clutch with an engaging device is complex, and the cost for manufacturing the conventional clutch is high. Additionally, the impact will occur when the engaging device of the conventional clutch is engaged or disengaged, whereby the structure of the conventional clutch is easily damaged and the difference of rotation speed between the driving device and the loading must be limited to a small range.

Another type of the conventional clutch comprises an engaging device with an electrical control device. The electrical control device is used to control the engagement or disengagement of the engaging device. However, the structure of the conventional clutch with the electrical control device is also complex, and the electrical control device is easily interfered with by electromagnetic waves.

To overcome the shortcomings, the present invention tends to provide an ultrasonic clutch to mitigate or obviate the aforementioned problems.

SUMMARY OF THE INVENTION

The main objective of the invention is to provide an ultrasonic clutch with a simplified structure and that is kept from the interference of electromagnetic waves. The clutch has a driving element, a driven element and an electric power source. The driving element and the driven element are respectively connected to a driving device and a loading. At least one of the driving element and the driven element is a piezoelectric device. The driven element corresponds to and abuts against the driving element. The power source is electrically connected to the piezoelectric device to provide an electric power to the piezoelectric device. Accordingly, when the electric power is applied to the piezoelectric device, a harmonic motion of a mechanical resonance or a near-field acoustic levitation will occur above the driving element. Consequently, a radiation pressure will be generated from the vibration of the piezoelectric device as the driving element to make the driven element move far apart from the driving element.

Other objects, advantages and novel features of the invention will become more apparent from the following detailed description when taken in conjunction with the accompanying drawings.

BRIEF DESCRIPTION OF THE DRAWINGS

FIG. 5 is a schematic diagram of a first embodiment of an ultrasonic clutch with the piezoelectric resonator in FIG. 3a;

FIG. 6 is a schematic diagram of a second embodiment of an ultrasonic clutch with the piezoelectric resonator in FIG. 3a;

FIG. 7 is a schematic diagram of a third embodiment of an ultrasonic clutch with the piezoelectric resonator in FIG. 3a;

FIG. 10 is a schematic diagram of a first embodiment of an ultrasonic clutch with the Langevin piezoelectric vibrator in FIGS. 8a;

FIG. 11 is a schematic diagram of a second embodiment of an ultrasonic clutch with the Langevin piezoelectric vibrator in FIG. 8a;

FIG. 12 is a schematic diagram of a third embodiment of an ultrasonic clutch with the Langevin piezoelectric vibrator in FIGS. 8a;

DETAILED DESCRIPTION OF PREFERRED EMBODIMENT

Figure 1:
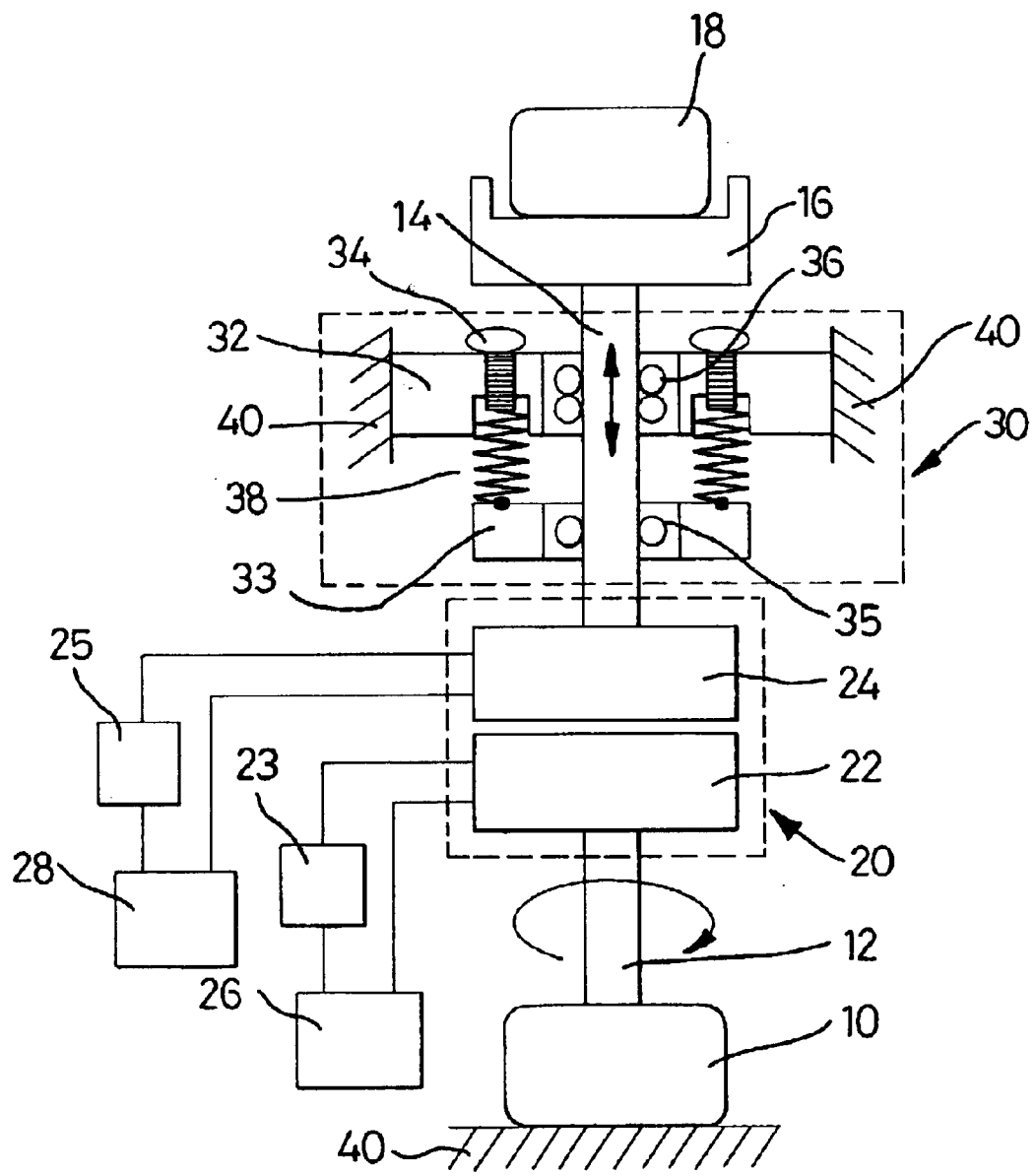
FIG. 1 is a schematic diagram of an embodiment of a vertical driving-loading system with an ultrasonic clutch in accordance with the present invention.
Figure 2:
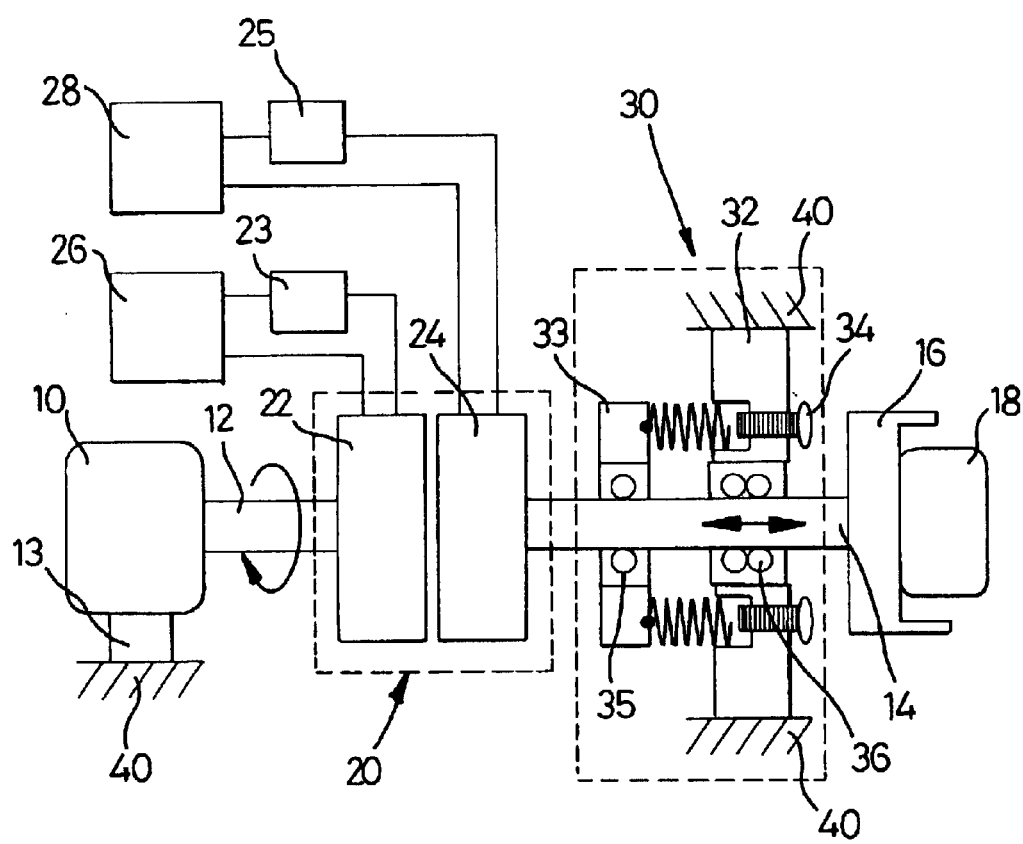
FIG. 2 is a schematic diagram of an embodiment of a horizontal driving-loading system with an ultrasonic clutch in accordance with the present invention.

FIG. 1 is a schematic diagram of a vertical driving-loading system with an ultrasonic clutch. FIG. 2 is a schematic diagram of a horizontal driving-loading system with an ultrasonic clutch. In FIG. 2, a driving device 10 is fixed on a secured base 13. With reference to FIG. 1, a driving-loading system comprises a driving device 10 on a platform 40, a shaft 12 of the driving device 10, a loading 18 on a loading plate 16, an output axle 14 of the loading 18, an ultrasonic clutch 20, and a pre-loaded force regulator 30. The ultrasonic clutch 20 is mounted between the driving device 10 and the loading 18 to control the connection and separation between the two elements through the operation of control switches 23 and 25. An ultrasonic clutch subsystem includes an ultrasonic clutch 20, two alternating current (AC) power sources 26 and 28, and two control switches 23 and 25. Wherein, the ultrasonic clutch 20 in accordance with the present invention comprises a driving element 22 and a driven element 24, and at least one piezoelectric device is employed in the ultrasonic clutch 20. The pre-loaded force regulator 30 comprises a secured base 32, three adjusting screws 34, three springs 38 and a moving base 33. The springs 38, mounted between the screws 34 and the moving base 33, are governed by the screws 34 screwed through the secured base 32 to provide a pre-loaded force on the moving base 33. With the pre-loaded force, friction between the driving element 22 and the driven element 24 is adjusted to control the twisted force and speed of the output axle 14. The moving base 33 is attached to the outer surface of the ball bearing 35, and the output axle 14 is attached to the inner surface of the ball bearing 35. Consequently, the output axle 14 rotates and extends along the axis of the output axle 14 through a linear bearing 36. Then, the outer surface of the linear bearing 36 is attached to the secured base 32, and the inner surface of the linear bearing 36 abuts against the output axle 14.

Figure 3A:
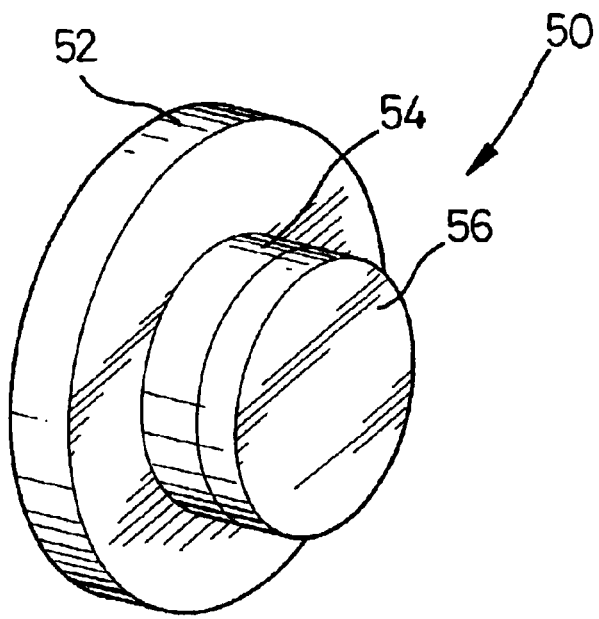
FIG. 3a is a schematic diagram of a piezoelectric resonator.
Figure 3B:
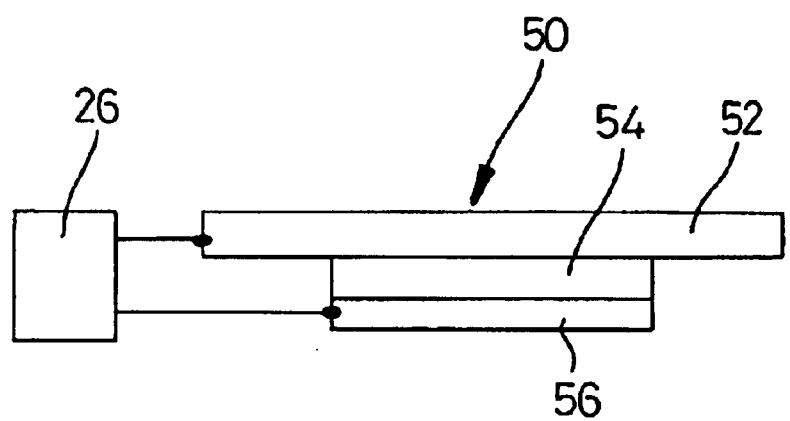
FIG. 3b is a schematic diagram of a piezoelectric resonator connected to an AC power supply.

With reference to FIG. 3a, a piezoelectric resonator 50 comprises a metal disk 52 with a rigid planar bottom, a piezoelectric ceramic disk 54, and a silvered electrode 56. Th metal disk 52 is attached to a first side of the piezoelectric ceramic disk 54, and the silvered electrode 56 attached to a second side of the piezoelectric ceramic disk 54. Thus, the piezoelectric resonator 50 can be employed in the driving element 22 or the driven element 24 or both elements of the ultrasonic clutch 20 in FIG. 1. According to FIG. 3b, the metal disk 52 and the silvered electrode 56 are electrically connected to an AC power source 26.

Figure 4A:
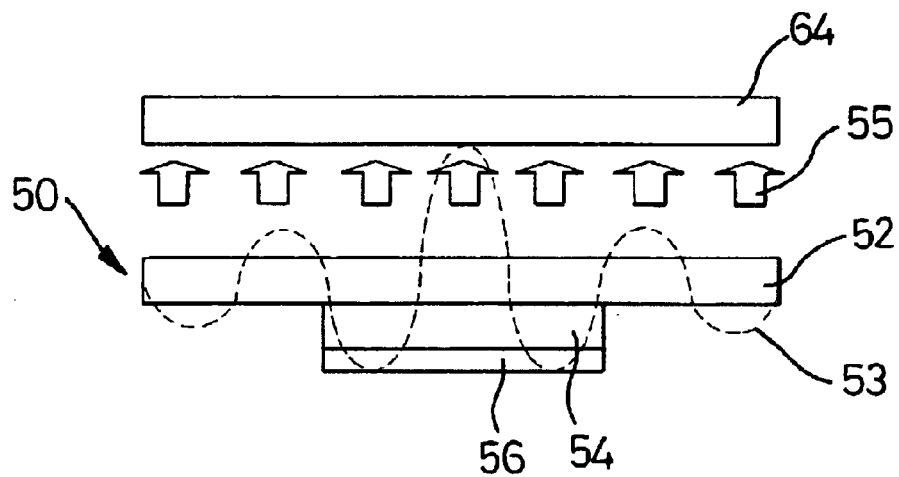
FIG. 4a is a schematic diagram of the near-field acoustic levitation driven by the flexural vibration on the piezoelectric resonator in FIGS. 3a and 3b to levitate a heavyweight object with a rigid planar bottom.
Figure 4B:
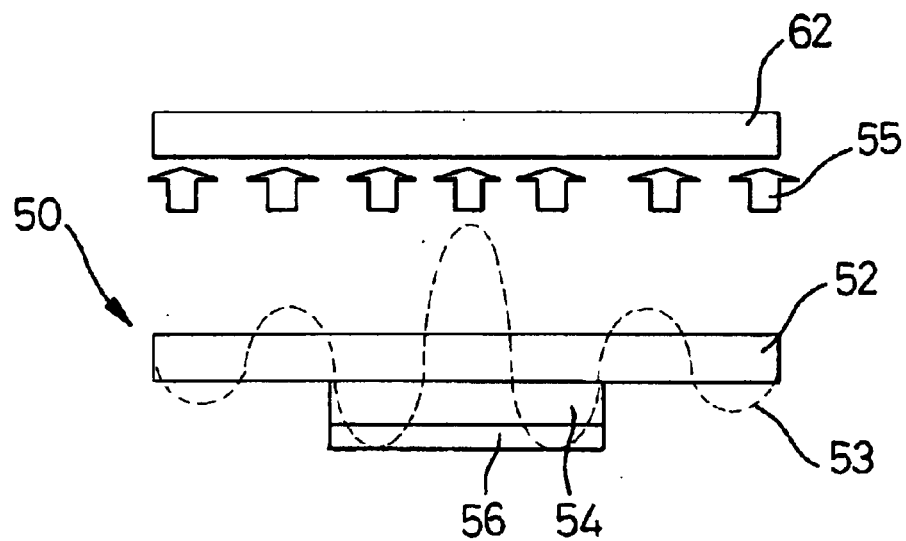
FIG. 4b is a schematic diagram of the near-field acoustic levitation driven by the flexural vibration on the piezoelectric resonator in FIGS. 3a and 3b to levitate a lightweight object with a rigid planar bottom.

With reference to FIG. 4b, a lightweight object 62 with a rigid planar bottom is levitated by a radiation pressure 55 that is generated from the flexural vibration wave 53 on the metal disk 52 of the piezoelectric resonator 50. Similarly, with reference to FIG. 4a, a heavyweight object 64 with a rigid planar bottom is pushed using a radiation pressure 55 that is generated from the flexural vibration wave 53 on the metal disk 52. The phenomenon that the objects 62 and 64 are pushed away from the surface of the metal disk 53 is called the near-field ultrasonic levitation. With the near-field ultrasonic levitation, for a particular flexural vibration wave 53, the levitation height between the piezoelectric resonator 13 and the object 62 decreases as the weight per area of the object 62 increases. For a given the weight per area of the object 62, the levitation height between the piezoelectric resonator 13 and the object 62 increases as the amplitude of the flexural vibration wave 53 increases. Consequently, the near-field acoustic levitation occurs above the metal disk 52 to push the objects 62 and 64 away from the metal disk 52 when the AC power source 16 is applied to the piezoelectric resonator 50. Then, the near-field ultrasonic levitation is used to suspend the lightweight object 62 in FIG. 4b and make a harmonic motion of the heavyweight object 64 in FIG. 4a.

Figure 5:
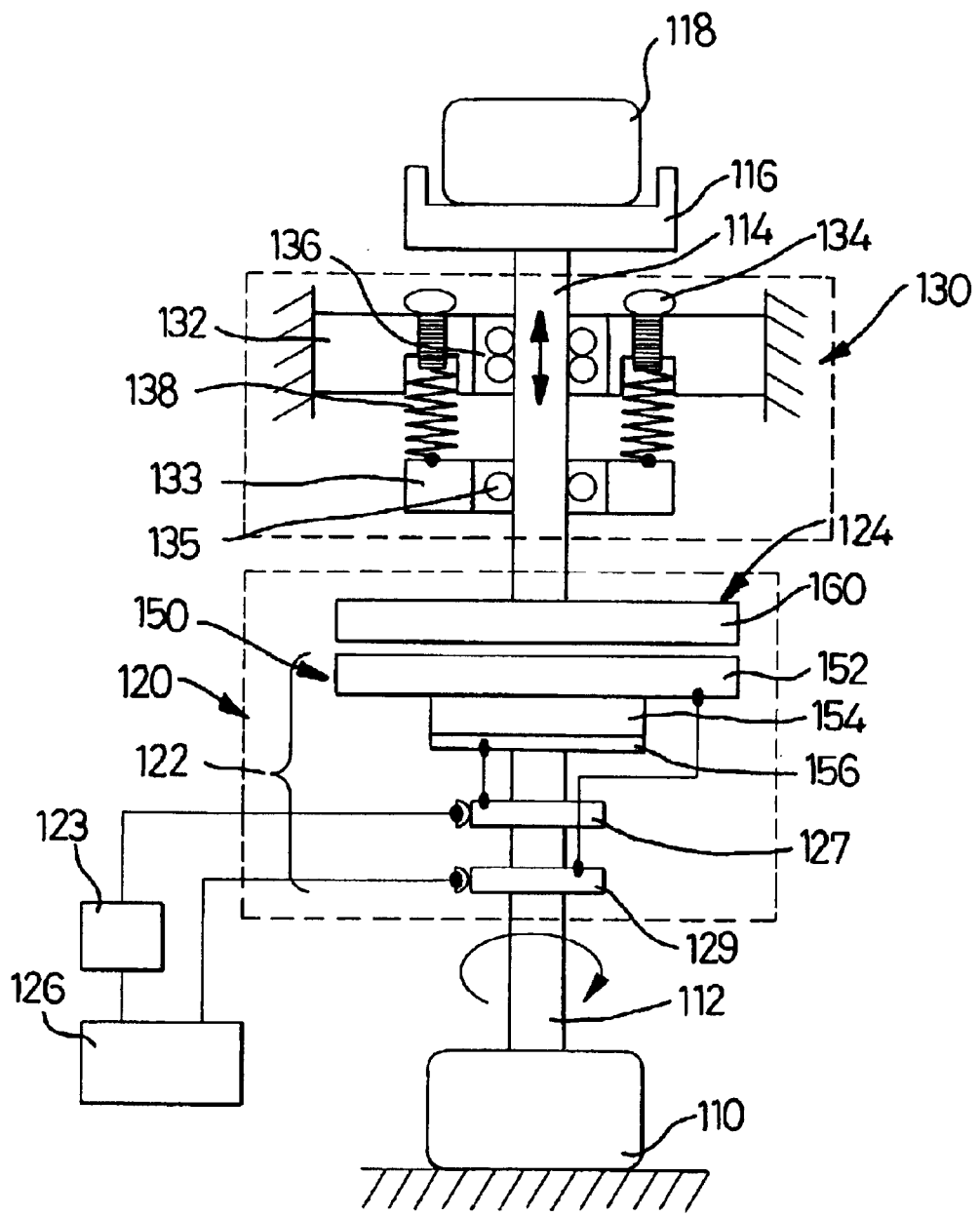

With reference to FIG. 5, an ultrasonic clutch 120 comprises a piezoelectric resonator 150 with two electric rings 127 and 129 as a driving element 122 and a metal disk 160 with a rigid planar bottom as a driven element 124. The piezoelectric resonator 150 is fixed to the shaft 112, and the metal disk 160 is attached to the output axle 114. The metal disk 152 and the silvered electrode 156 are electrically connected to an AC power source 126, and the electric ring 127 is connected to the AC power source 126 through a control switch 123. In FIG. 5, when the control switch 123 is turned off, the driven element 124 abuts against the driving element 122, and the output axle 114 rotates with the shaft 112 because of friction between the piezoelectric resonator 150 and the metal disk 160. Then, the twisted force is controlled using the screws 134. When the control switch 123 is turned on, the driven element 124 attached to the output axle 114 is rapidly pushed away from the driving element 122 fixed to the shaft 112 using the radiation pressure 55 in FIGS. 4a and 4b. Then, the connection between the driving element 122 and the driven element 124 is broken, and the output axle 114 does not rotate with the shaft 112.

Figure 6:
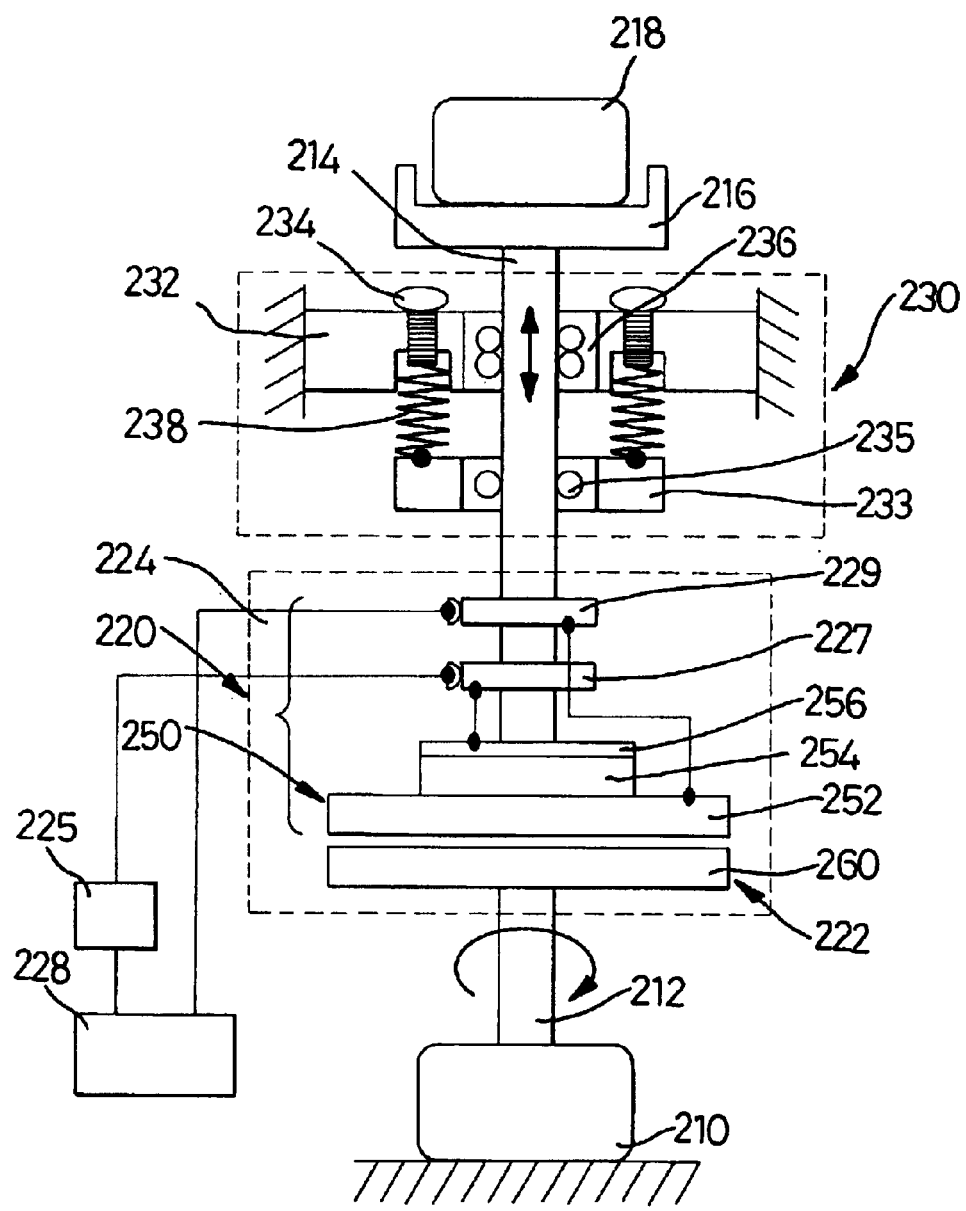

According to FIG. 6, an ultrasonic clutch 220 includes a metal disk 260 with a rigid planar bottom as a driving element 222 and a piezoelectric resonator 250 with two electric rings 227 and 229 as a driven element 224. The metal disk 260 is fixed to the shaft 212 and the piezoelectric resonator 250 is attached to the output axle 214. The metal disk 252 and the silvered electrode 256 are electrically connected to an AC power source 126, and the electric ring 227 is connected to the AC power source 228 through a control switch 225. In FIG. 6, when the control switch 225 is turned off, the driven element 224 abuts against the driving element 222, and the output axle 214 rotates with the shaft 212. When the control switch 225 is turned on, the connection between the driving element 222 and the driven element 224 is broken, and the output axle 214 does not rotate with the shaft 212.

Figure 7:
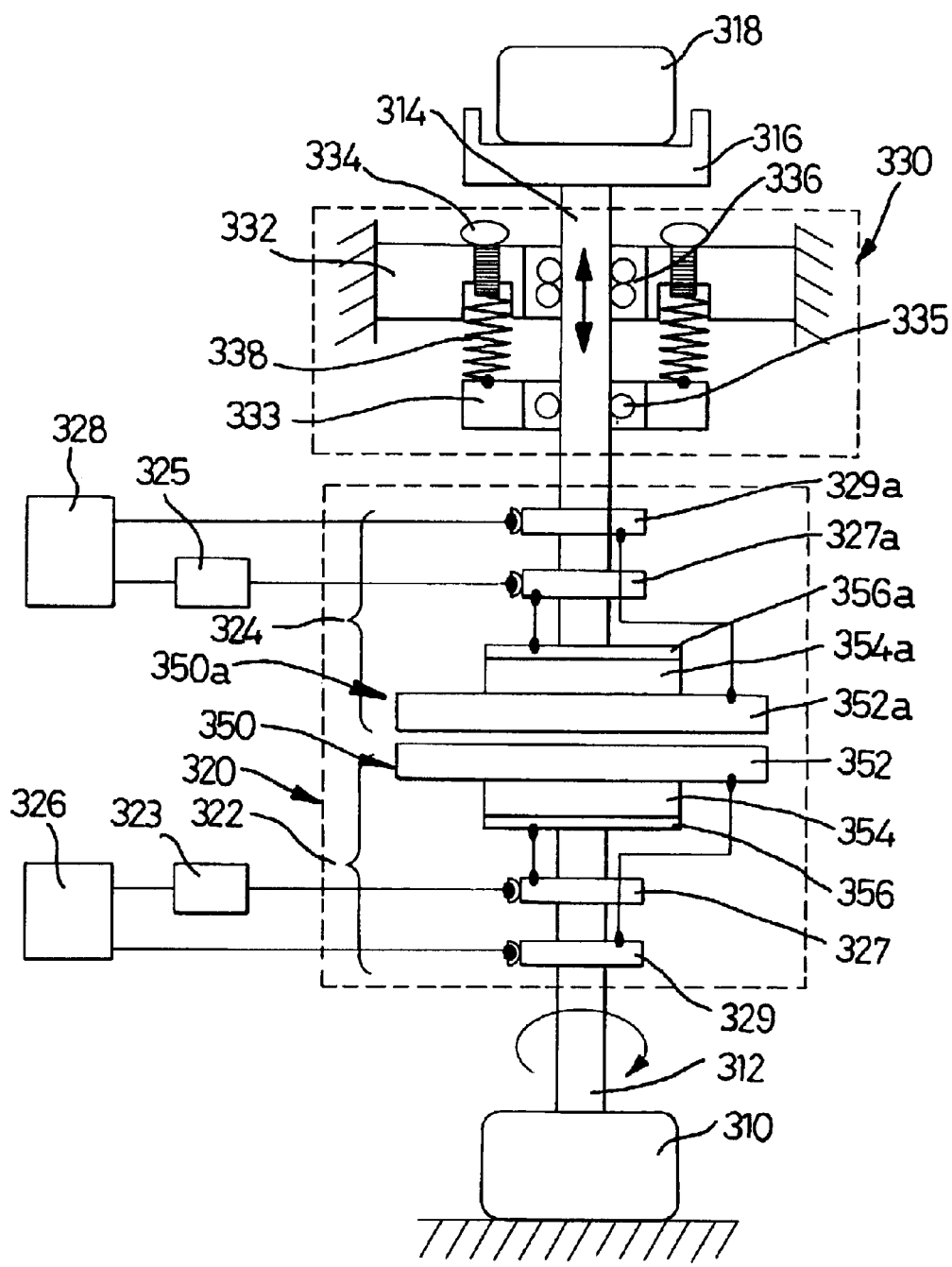

With reference to FIG. 7, an ultrasonic clutch 320 includes two piezoelectric resonators 350 and 350a as a driving element 322 and 324, respectively. The piezoelectric resonator 350 is fixed to the shaft 312, and is electrical connected to an AC power source 326 through two electric rings 327 and 329. The other piezoelectric resonator 350a is attached to the output axle 314, and is electrical connected to an AC power source 328 through two electric rings 327a and 329a. In FIG. 7, when at least one control switch 323 or 325 is turned on, the connection between the driving element 322 and the driven element 324 is broken, and the output axle 314 does not rotate with the shaft 312. When both control switches 323 and 325 are turned off, the driven element 324 abuts against the driving element 322, and the output axle 314 rotates with the shaft 312 because of friction between the piezoelectric resonators 350 and 350a.

Figure 8A:
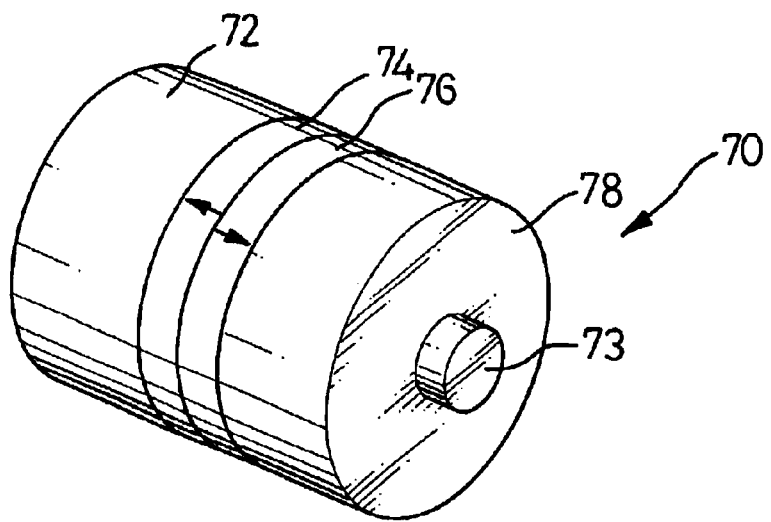
FIG. 8a is a schematic diagram of a bolt-clamped Langevin piezoelectric vibrator.
Figure 8B:
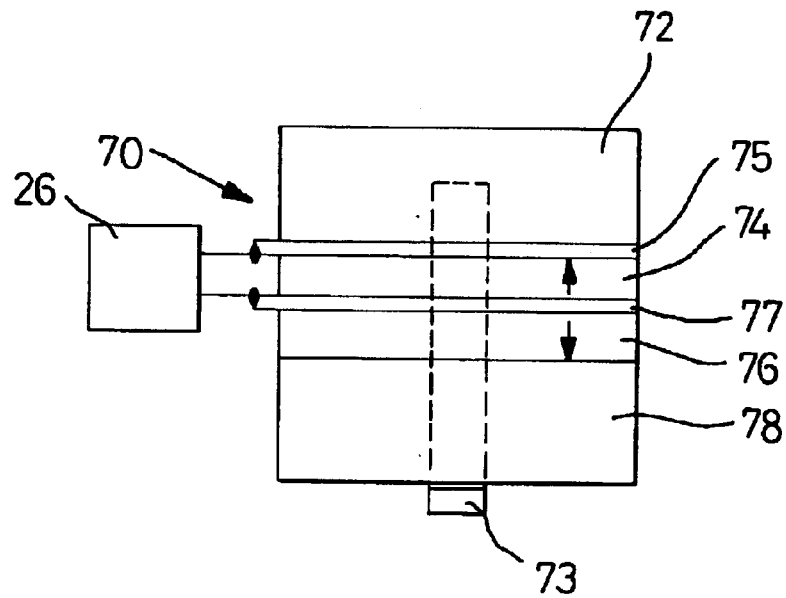
FIG. 8b is a schematic diagram of a bolt-clamped Langevin piezoelectric vibrator connected to an AC power supply.

FIG. 8a is a schematic diagram of a bolt-clamped Langevin piezoelectric vibrator. The Langevin piezoelectric vibrator 70 comprises two piezoelectric ceramic disks 74 and 76 abutting with each other and two metal disks 72 and 78 respectively attached to the ceramic disks 74 and 76 at a side far from each other. A bolt 73 is then screwed into the ceramic disks 74 and 76 and the metal disks 72 and 78 to securely combine the ceramic disks 74 and 76 and the metal disks 72 and 78 together. Moreover, the Langevin piezoelectric vibrator 70 can be employed in the driving element 22 or the driven element 24 or both elements of the ultrasonic clutch 20 in FIG. 1. According to FIG. 8b, the piezoelectric ceramic disks 74 and 76 are electrically connected to an AC power source 26 through copper rings 75 and 77, respectively.

Figure 9A:
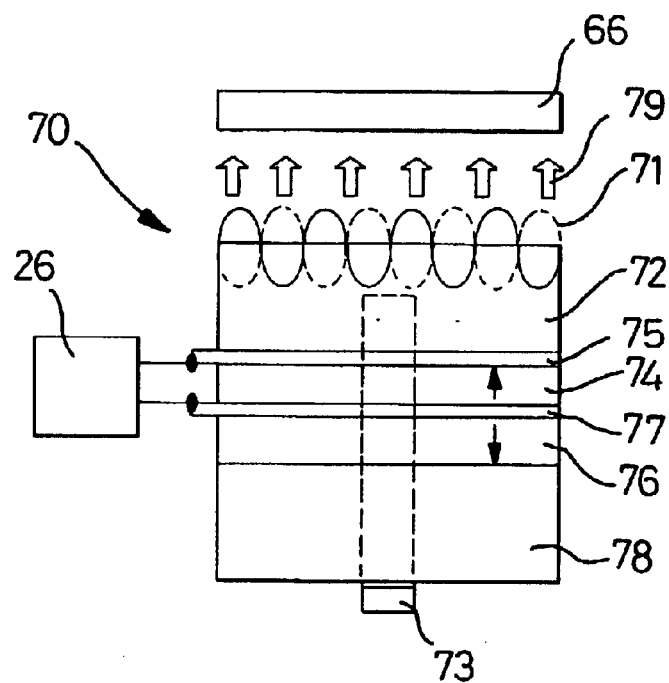
FIG. 9a is a schematic diagram of the near-field acoustic levitation driven by the longitudinal vibration on the Langevin piezoelectric vibrator in FIGS. 8a and 8b to levitate a lightweight object with a rigid planar bottom.
Figure 9B:
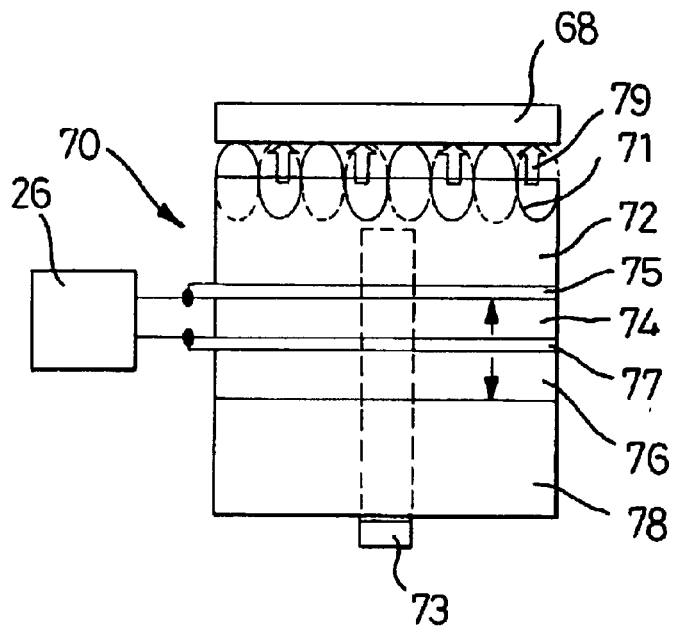
FIG. 9b is a schematic diagram of the near-field acoustic levitation driven by the longitudinal vibration on the Langevin piezoelectric vibrator in FIGS. 8a and 8b to levitate a heavyweight object with a rigid planar bottom.

With reference to FIG. 9a, a lightweight object 66 with a rigid planar bottom is levitated by a radiation pressure 79 of acoustic plane waves, which are vertically generated from the longitudinal vibration 71 on the radiation surface of the metal disk 72 of the Langevin piezoelectric vibrator 70. Similarly, with reference to FIG. 9b, a heavyweight object 68 with a rigid planar bottom is pushed using a radiation pressure 79 that is generated from the longitudinal vibration wave 71 on the metal disk 72. The phenomenon that the objects 66 and 68 are pushed away from the surface of the metal disk 72 is called the near-field ultrasonic levitation. With the near-field ultrasonic levitation, for a particular longitudinal vibration wave 71, the levitation height between the Langevin piezoelectric vibrator 70 and the object 66 decreases as the weight per area of the object 66 increases. For a given the weight per area of the object 66, the levitation height between the Langevin piezoelectric vibrator 70 and the object 62 increases as the amplitude of the longitudinal vibration wave 71 increases. Consequently, the near-field acoustic levitation occurs above the metal disk 72 to push the objects 66 and 68 away from the metal disk 72, and to produce a piston-like motion of the objects 66 and 68 when the AC power source 26 is applied to the Langevin piezoelectric vibrator 70.

Figure 10:
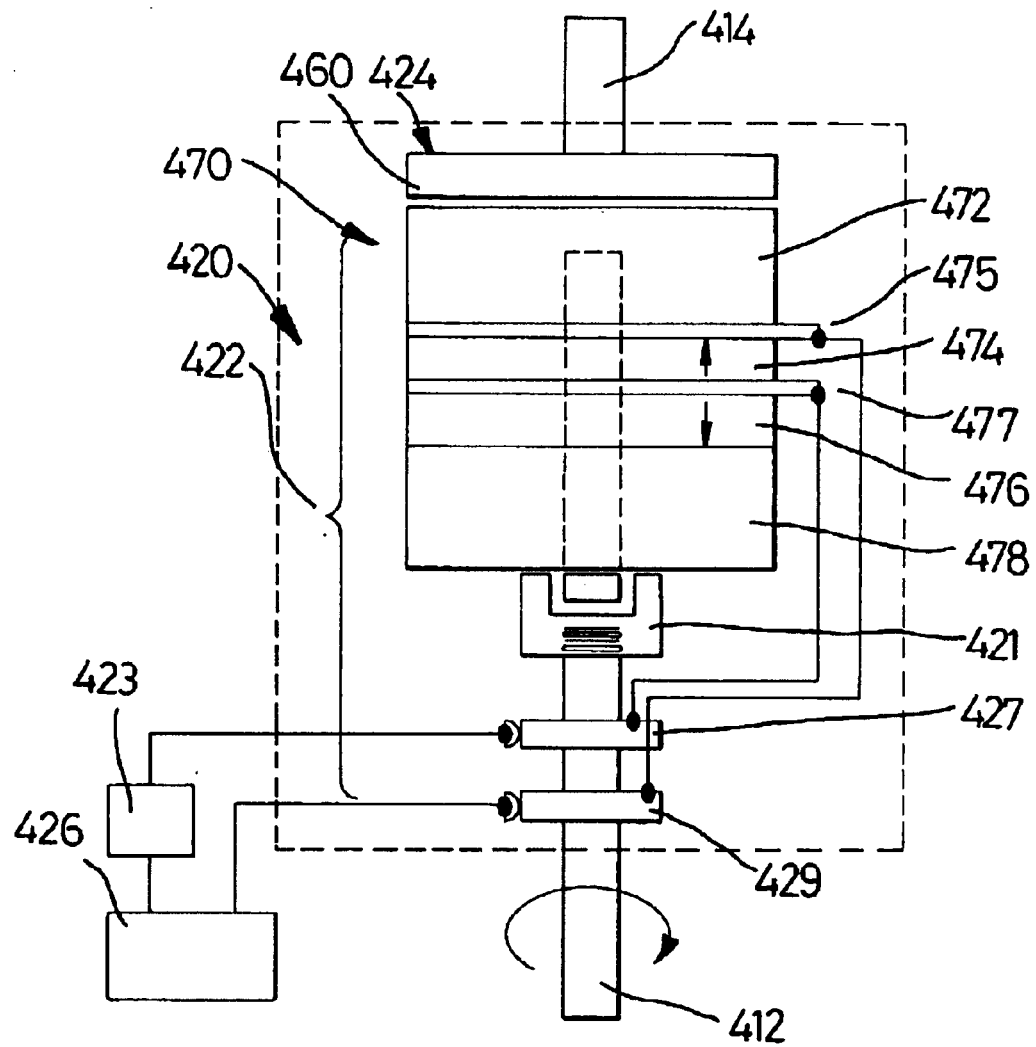

With reference to FIG. 10, an ultrasonic clutch 420 includes a bolt-clamped Langevin piezoelectric vibrator 470 with two electric rings 427 and 429 as a driving element 422 and a metal disk 460 with a rigid planar bottom as a driven element 424. The Langevin piezoelectric vibrator 470 is fixed to the shaft 412, and the metal disk 460 is attached to the output axle 414. The copper rings 475 and 477 of the Langevin piezoelectric vibrator 470 are electrically connected to an AC power source 426 through electric rings 427 and 429 and a control switch 423. In FIG. 10, when the control switch 423 is turned off, the driven element 424 abuts against the driving element 422, and the output axle 414 rotates with the shaft 412 because of friction between the Langevin piezoelectric vibrator 470 and the metal disk 460. When the control switch 423 is turned on, the connection between the driving element 422 and the driven element 424 is broken, and the output axle 414 does not rotate with the shaft 412.

Figure 11:
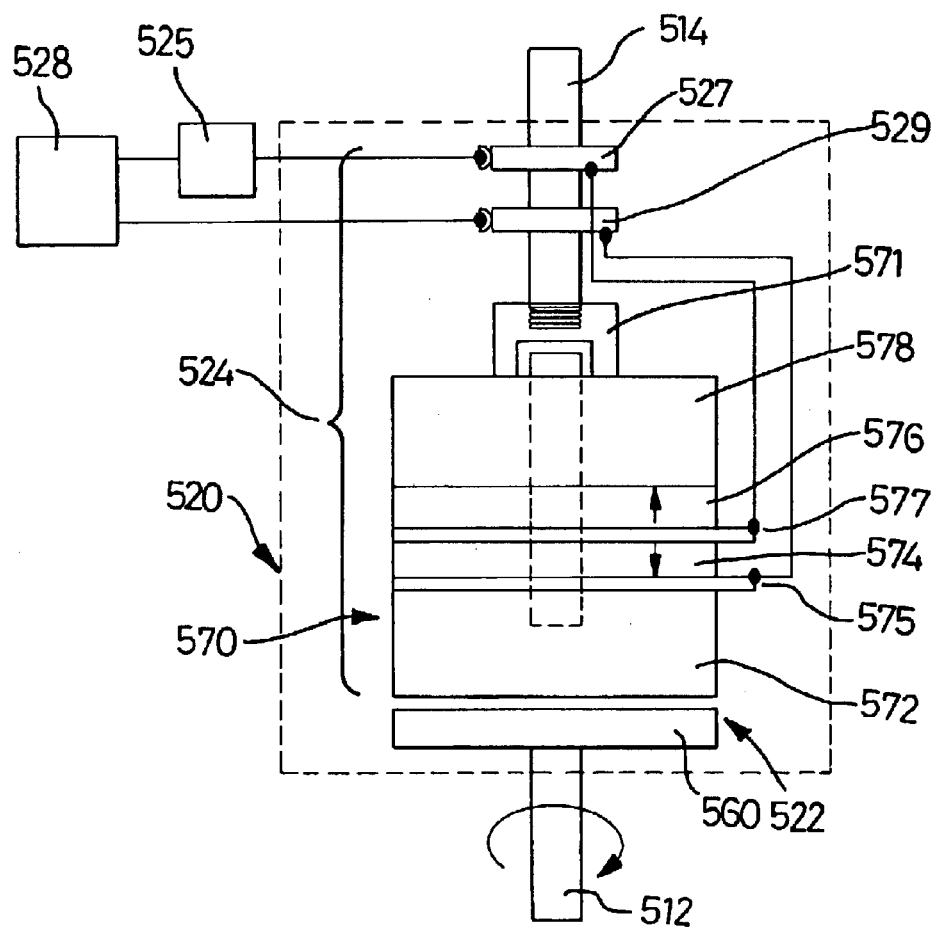

According to FIG. 11, an ultrasonic clutch 520 includes a metal disk 560 with a rigid planar bottom as a driving element 522 and a bolt-clamped Langevin piezoelectric vibrator 570 with two electric rings 527 and 529 as a driven element 524. The metal disk 560 is fixed to the shaft 512 and the Langevin piezoelectric vibrator 570 is attached to the output axle 514. The copper rings 575 and 577 of the Langevin piezoelectric vibrator 570 are electrically connected to an AC power source 528 through electric rings 527 and 529 and a control switch 525. In FIG. 11, when the control switch 525 is turned off, the driven element 524 abuts against the driving element 522, and the output axle 514 rotates with the shaft 512. When the control switch 525 is turned on, the connection between the driving element 522 and the driven element 524 is broken, and the output axle 514 does not rotate with the shaft 512.

Figure 12:
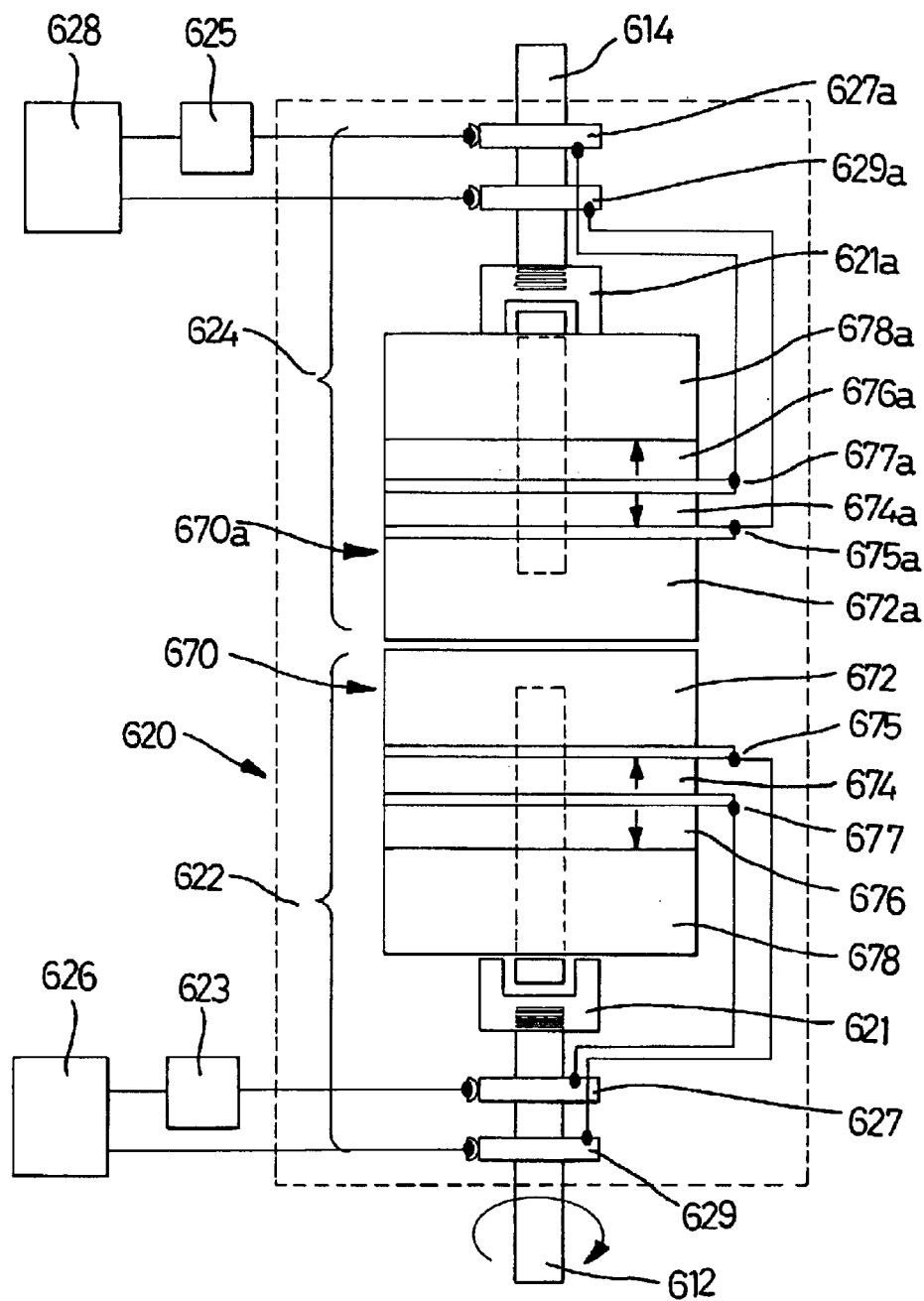

With reference to FIG. 12, an ultrasonic clutch 620 includes two bolt-clamped Langevin piezoelectric vibrators 670 and 670a as a driving element 622 and 624, respectively. The Langevin piezoelectric vibrator 670 is fixed to the shaft 612, and is electrical connected to an AC power source 626 through two electric rings 627 and 629 and a control switch 623. The other Langevin piezoelectric vibrator 670a is attached to the output axle 614, and is electrical connected to an AC power source 628 through two electric rings 627a and 629a. In FIG. 12, when at least one control switch 623 or 625 is turned on, the connection between the driving element 622 and the driven element 624 is broken, and the output axle 614 does not rotate with the shaft 612. When both control switches 623 and 625 are turned off, the driven element 624 abuts against the driving element 622, and the output axle 614 rotates with the shaft 612 because of friction between the Langevin piezoelectric vibrators 670 and 670a.

Figure 13:
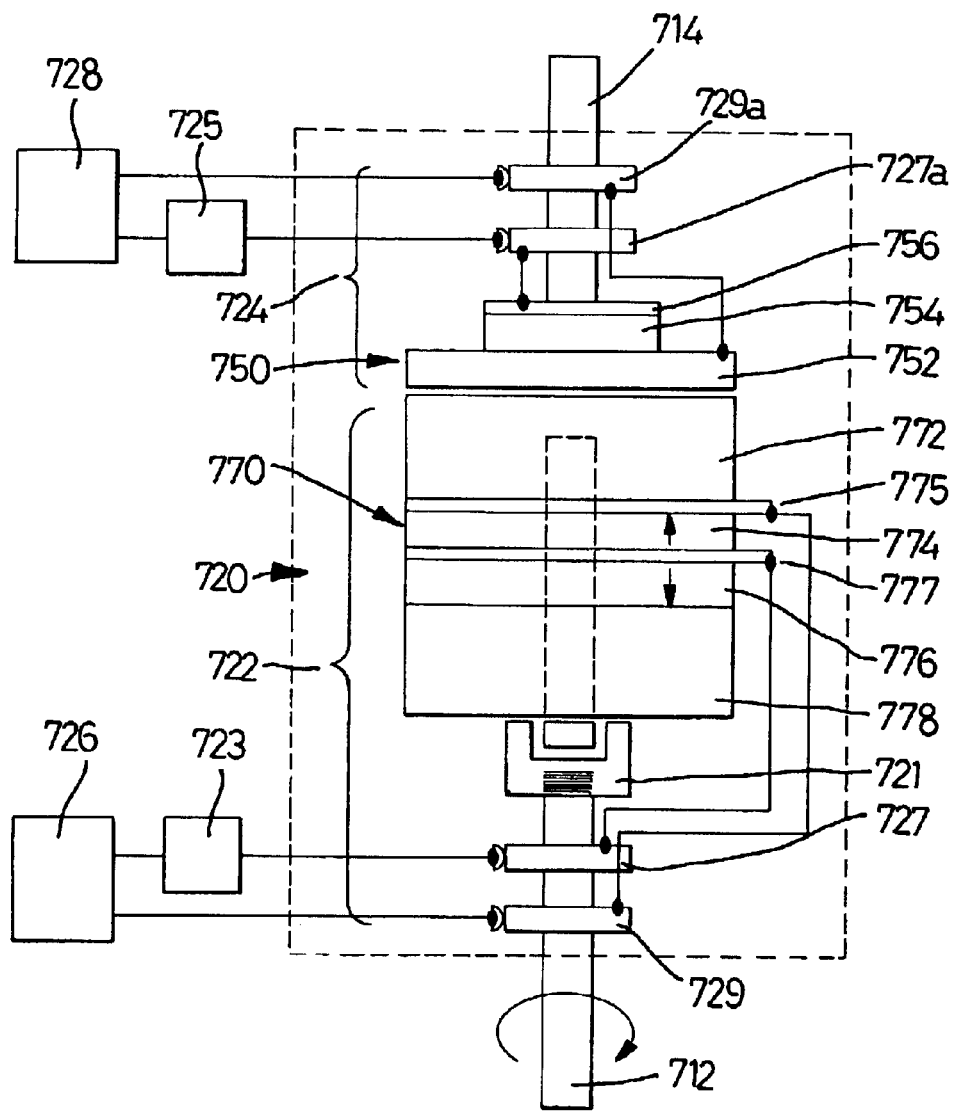
FIG. 13 is a schematic diagram of a first embodiment of an ultrasonic clutch with hybrid piezoelectric devices.

With reference to FIG. 13, an ultrasonic clutch 720 includes a bolt-clamped Langevin piezoelectric vibrator 770 with two electric rings 727 and 729 as a driving element 722, and a piezoelectric resonator 750 with two electric rings 727a and 729a as a driven element 724. The Langevin piezoelectric vibrator 770 is fixed to the shaft 712, and is electrical connected to an AC power source 726 through the electric rings 727 and 729 and a control switch 723. The piezoelectric resonator 750 is attached to the output axle 714, and is electrical connected to an AC power source 728 through two electric rings 727a and 729a and a control switch 725. In FIG. 12, when at least one control switches 723 or 725 is turned on, the connection between the driving element 722 and the driven element 724 is broken, sand the output axle 714 does not rotate with the shaft 712. When both control switches 723 and 725 are.turned off, the driven element 724 abuts against the driving element 722, and the output axle 714 rotates with the shaft 712 because of friction between the Langevin piezoelectric vibrator 770 and the piezoelectric resonator 750.

Figure 14:
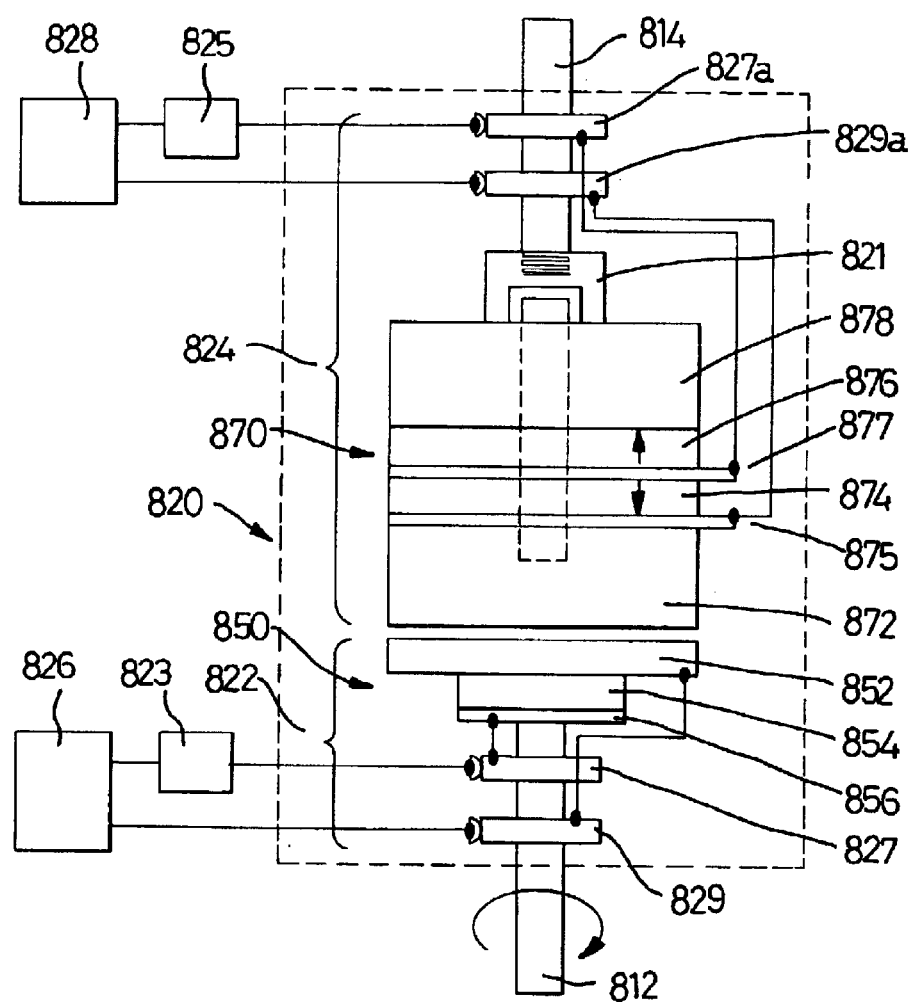
FIG. 14 is a schematic diagram of a second embodiment of an ultrasonic clutch with hybrid piezoelectric devices.

According to FIG. 14, an ultrasonic clutch 820 comprises a piezoelectric resonator 850 with two electric rings 827a and 829a working as a driving element 824 and a bolt-clamped Langevin piezoelectric vibrator 870 with two electric rings 827 and 829 serving as a driven element 822. Then, the piezoelectric resonator 850 is attached to the shaft 812, and is electrical connected to an AC power source 826 through two electric rings 827 and 829 and a control switch 823. Moreover, the Langevin piezoelectric vibrator 870 is fixed to the output axle 814, and is electrical connected to an AC power source 828 through the electric rings 827a and 829a and a control switch 825. In FIG. 14, when at least one control switch 823 or 825 is turned on, the connection between the driving element 822 and the driven element 824 is broken, and the output axle 814 does not rotate with the shaft 812. When both control switches 823 and 825 are turned off, the driven element 824 abuts against the driving element 822, and the output axle 814 rotates with the shaft 812.

The ultrasonic clutches presented in FIGS. 1–14 in accordance with the present invention is specified as follows. The structure of the presented ultrasonic clutch is simple, and the cost of those is low for manufacturing the ultrasonic clutches. Then, the impact occurring during the engagement and the disengagement of the presented ultrasonic clutches is small. Moreover, the presented ultrasonic clutches are unaffected by electromagnetic waves because there is no electrical element arranged in the presented ultrasonic clutches.

Figure 15:
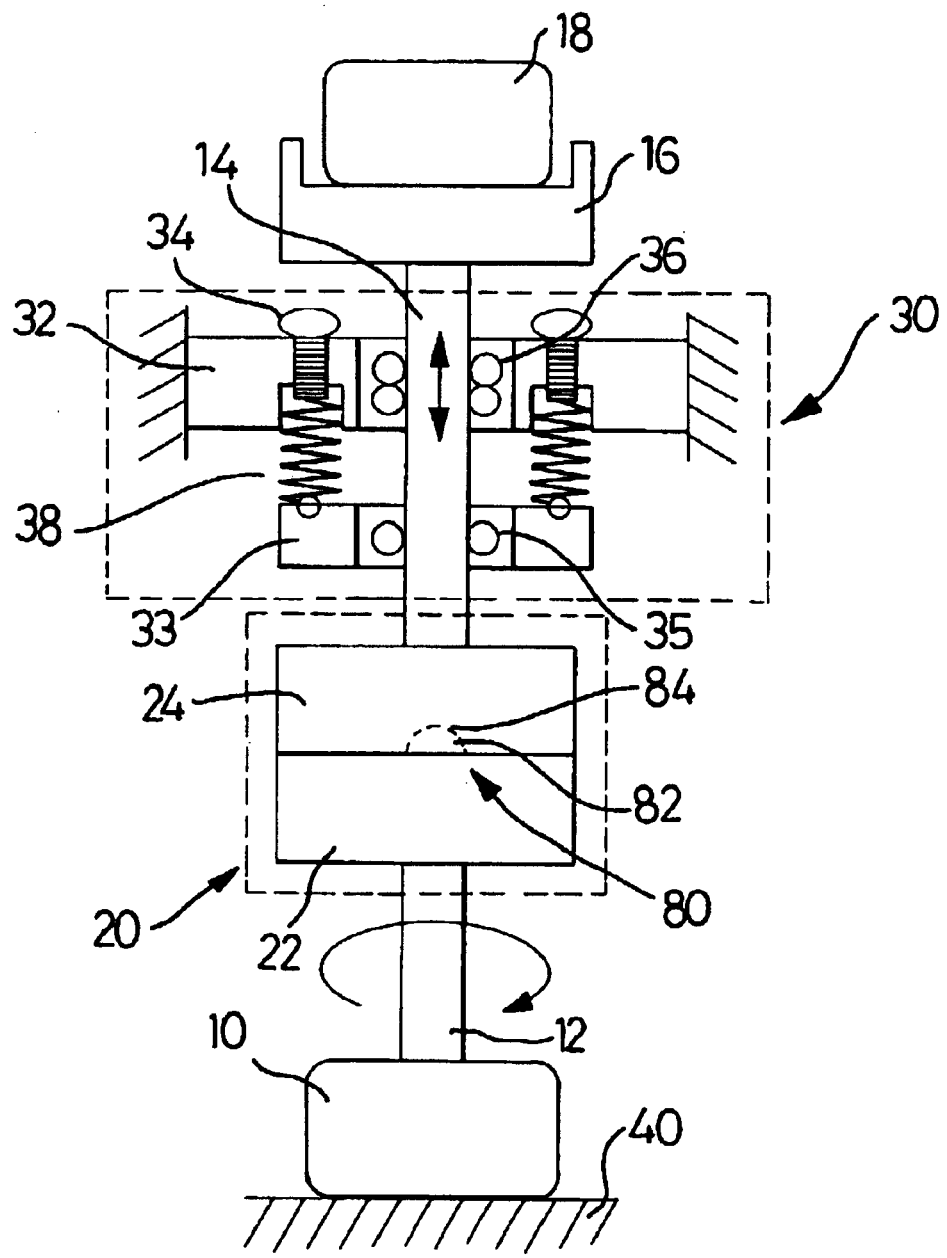
FIG. 15 is a schematic diagram of an ultrasonic clutch with a first embodiment of a positioning device.

With reference to FIG. 15, a first positioning device 80 is mounted between the driving element 22 and the driven element 24 to make the driven element 24 abut with the driving element 22 at a fixed position during the rotation of the output axle 14. The positioning device 80 comprises a bump 82 integrally formed on the driving element 22 and a recess 84 defined in the driven element 24 to receive the bump 82 on the driving element 22. When the driven element 24 abuts with the driving element 22, the driven element 24 will be guided to a fixed position by means of the engagement between the bump 82 and the recess 84. This can ensure that the axis of the output axle 14 is actually aligned with the axis of the shaft 12 of the driving device 10, such that the rotation of the output axle 14 is actually co-axial with the shaft 12. In practice, the bump 82 is formed on the driving element 22 and the recess 84 is defined in the driven element 24. In another practice, the bump 82 is formed on the driven element 24 and the recess 84 is defined in the driving element 22.

Figure 16:
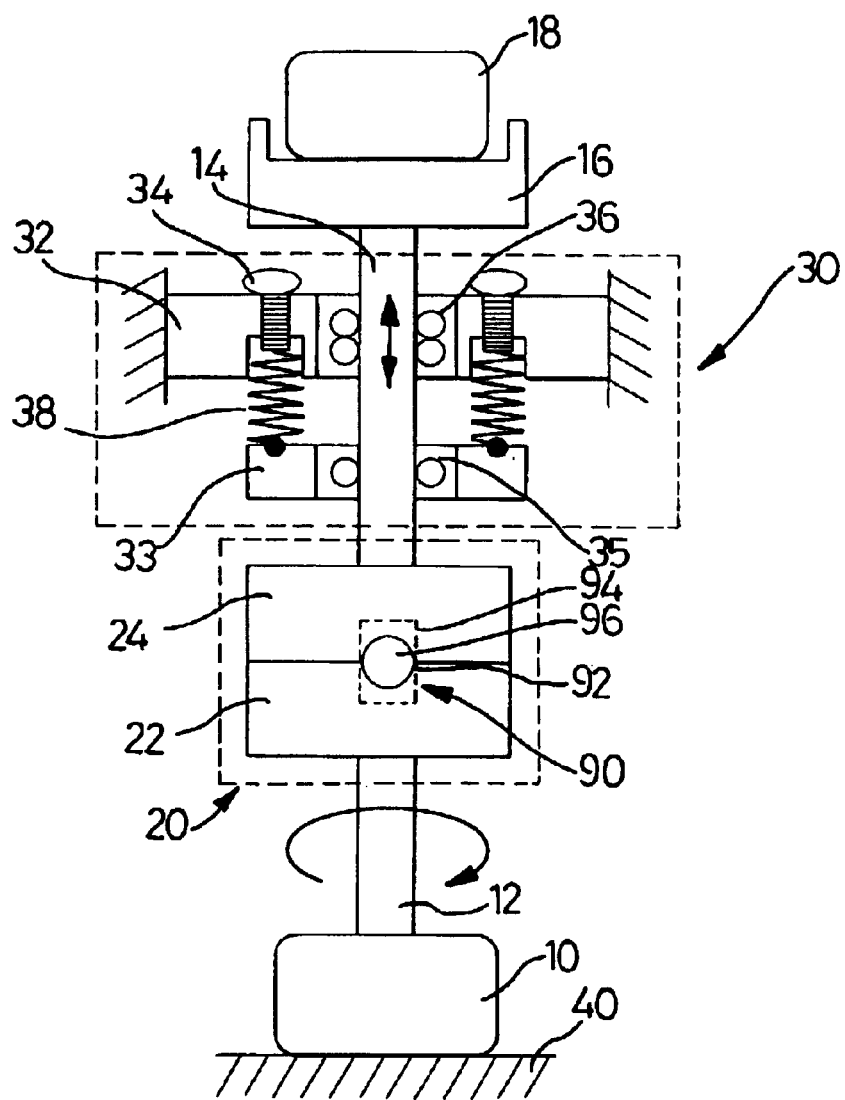
FIG. 16 is a schematic diagram of an ultrasonic clutch with a second embodiment of a positioning device.

With reference to FIG. 16, a second positioning device 90 comprises a first recess 92 defined in the driving element 22, a second recess 94 defined in the driven element 24 and a rigid ball 96. The second recess 94 in the driven element 24 aligns with the first recess 92 in the driving element 22. A stainless ball works as the rigid ball 96. Then, the rigid ball 96 is partially pressed into the first recess 92 in the driving element 22, and partially received in the second recess 94 of the driven element 22. With the engagement between the ball 96 and the second recess 94 in the driven element 24, the driven element 24 is guided to a fixed position relative to the driving element 22. This can also ensure that the axis of the output axle 14 is actually aligned with the axis of the shaft 12.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An ultrasonic clutch for mounting between a driving device with a shaft and a load with an output axle comprising:
    a driving element to be attached to the shaft of the driving device; a driven element corresponding to and abutting the driving element and to be connected to the output axle, wherein at least one of the driving element and driven element is a piezoelectric device with a planar radiation surface and employed to generate a mechanical vibration for forming a near-field acoustic levitation;
    an alternating current (AC) power source device electrically connected to the at least one piezoelectric device to provide an alternating current power to the at least one piezoelectric device so as to generate the mechanical vibration for forming the near-field acoustic levitation; and
    a positioning device mounted between the driving element and the driven element to make an axis of the shaft of the driving device align with an axis of the output axle of the load when the output axle rotates;
    wherein the positioning device includes
        a bump integrally formed on one of the driving element and the driven element; and
        a recess defined in the other element of the driving element and the driven element to receive the bump.

2. The ultrasonic clutch as claimed in claim 1, wherein the driving element is a piezoelectric device with a planar radiation surface and the driven element is a disk with a rigid planar surface abutting the planar radiation surface of the driving element; and
    the driving element is electrically connected to the AC power source device and is employed to generate a mechanical vibration for forming the near-field acoustic levitation.

3. The ultrasonic clutch as claimed in claim 2, wherein the driving element is a piezoelectric resonator comprising a piezoelectric ceramic disk having a first side and a second side, a silvered electrode attached to the first side of the piezoelectric ceramic disk and a metal disk with a planar radiation surface attached to the second side of the piezoelectric ceramic disk,
    wherein the metal disk is attached to the piezoelectric ceramic disk with a glue of silver, and the metal disk and the silvered electrode of the driving element are electrically connected to the AC power source device.

4. The ultrasonic clutch as claimed in claim 2, wherein the driving element is a Langevin piezoelectric vibrator comprising two piezoelectric ceramic disks abutting with each other, two metal disks attached to the piezoelectric ceramic disks respectively at a side far from each other and a bolt,
    wherein the bolt is screwed into the ceramic disks and the metal disks with planar radiation surfaces to securely combine the ceramic disks and the metal disks together, and the piezoelectric ceramic disks of the driving element are electrically connected to the AC power source device.

5. The ultrasonic clutch as claimed in claim 1, wherein the driven element is a piezoelectric device with a planar radiation surface and the driving element is a disk with a rigid planar surface abutting against the planar radiation surface of the driven element; and
    the driven element is electrically connected to the AC power device and generates a mechanical vibration to form the near-field acoustic levitation.

6. The ultrasonic clutch as claimed in claim 5, wherein the driven element is a piezoelectric resonator comprising a piezoelectric ceramic disk having a first side and a second side, a silvered electrode attached to the first side of the piezoelectric ceramic disk and a metal disk with a planar radiation surface attached to the second side of the piezoelectric ceramic disk,
    wherein the metal disk is attached to the piezoelectric ceramic disk with a glue of silver, and the metal disk and the silvered electrode of the driven element are electrically connected to the AC power source device.

7. The ultrasonic clutch as claimed in claim 5, wherein the driven element is a Langevin piezoelectric vibrator comprising two piezoelectric ceramic disks abutting each other, two metal disks attached to the piezoelectric ceramic disks respectively at a side far from each other and a bolt,
    wherein the bolt is screwed into the ceramic disks and the metal disks with planar radiation surfaces to securely combine the ceramic disks and the metal disks together, and the piezoelectric ceramic disks of the driving element are electrically connected to the AC power source device.

8. The ultrasonic clutch as claimed in claim 1, wherein both the driving element and the driven element are piezoelectric devices each having a planar radiation surface abutting with each other; and
    each piezoelectric device is a piezoelectric resonator and comprises a piezoelectric ceramic disk having a first side and a second side, a silvered electrode attached to the first side of the piezoelectric ceramic disk and a metal disk with a planar radiation surface attached to the second side of the piezoelectric ceramic disk, wherein the metal disk is attached to the piezoelectric ceramic disk with a glue of silver, and the metal disk and the silvered electrodes of the driving element and the driven element are electrically connected to the AC power source device.

9. The ultrasonic clutch as claimed in claim 8, wherein the AC power source device comprises two AC power sources electrically connected respectively to the driving element and the driven element.

10. The ultrasonic clutch as claimed in claim 1, wherein both the driving element and the driven element are piezoelectric devices; and each piezoelectric device is a bolt clamped Langevin piezoelectric vibrator and comprises two piezoelectric ceramic disks abutting each other, two metal disks attached respectively to the piezoelectric ceramic disks at sides far from each other and a bolt, wherein the bolt is screwed into the ceramic disks and the metal disks with planar radiation surfaces to securely combine the ceramic disks and the metal disks together, and the piezoelectric ceramic disks of the driving element and the driven element are electrically connected to the AC power source device.

11. The ultrasonic clutch as claimed in claim 10, wherein the AC power source device comprises two AC power sources electrically connected respectively to the driving element and the driven element.

12. The ultrasonic clutch as claimed in claim 1, wherein the positioning device includes a bump integrally formed on the driving element and a recess defined in the driven element to receive the bump on the driving element.

13. The ultrasonic clutch as claimed in claim 1, wherein the positioning device comprises a bump integrally formed on the driven element and a recess defined in the driving element to receive the bump on the driven element.

14. The ultrasonic clutch as claimed in claim 1 further comprising a control switch mounted between the AC power source device and each at least one piezoelectric device to control an electric connection between the AC power source device and the at least one piezoelectric device.

* * * * *